(12) United States Patent
Volpe

(10) Patent No.: US 11,399,525 B1
(45) Date of Patent: Aug. 2, 2022

(54) MODULAR FISHING LURE HOLDER

(71) Applicant: Nicola Volpe, Yaphank, NY (US)

(72) Inventor: Nicola Volpe, Yaphank, NY (US)

( * ) Notice: Subject to any disclaimer, the term of this patent is extended or adjusted under 35 U.S.C. 154(b) by 851 days.

(21) Appl. No.: 16/054,639

(22) Filed: Aug. 3, 2018

(51) Int. Cl.
*A01K 97/06* (2006.01)

(52) U.S. Cl.
CPC .................................... *A01K 97/06* (2013.01)

(58) Field of Classification Search
CPC ........ A01K 97/06; A01K 97/00; A01K 97/04; B63B 17/00; Y10S 224/92; Y10S 224/922
USPC ................................. 43/54.1, 57.2, 25.2, 21.2
See application file for complete search history.

(56) References Cited

U.S. PATENT DOCUMENTS

| | | | | | |
|---|---|---|---|---|---|
| 2,530,292 | A | * | 11/1950 | Crook | A01K 97/06 43/57.1 |
| 2,548,080 | A | * | 4/1951 | Thorn | A01K 97/06 224/663 |
| 2,691,840 | A | * | 10/1954 | Paule | A01K 97/00 43/25.2 |
| 2,825,992 | A | * | 3/1958 | Miller | A01K 97/06 43/25.2 |
| 2,993,293 | A | * | 7/1961 | Blout | A01K 97/06 43/57.1 |
| 3,040,464 | A | * | 6/1962 | Garrett | A01K 97/06 43/25.2 |
| 4,972,625 | A | * | 11/1990 | Barnes | A01K 97/06 206/315.11 |
| 5,056,256 | A | * | 10/1991 | Truax | A01K 87/00 43/26 |

\* cited by examiner

*Primary Examiner* — Kathleen I Alker
*Assistant Examiner* — Jeffrey R Larsen

(57) ABSTRACT

A modular fishing lure holder includes a generally cylindrical lure housing having an outer housing clip that serves to attach the holder to a user's person. The housing clip may be integral with the lure holder body or it may be incorporated in a frictionally fitted collar. Exterior clamps or hinge accessories may be provided to allow for a plurality of the lure holders to be linked together. The outer housing clip also includes a cylindrical clip attachment with a hook shaft clamp near one of the lure housing ends to frictionally hold the lure in place by sliding the hook therein.

3 Claims, 17 Drawing Sheets

MODULAR FISHING LURE HOLDER

BACKGROUND OF THE INVENTION

The present invention relates, generally, to the sport of fishing and, more particularly, to a personal carrier for fishing lures that attach to the user's waders, clothing or other accessories.

SUMMARY OF THE INVENTION

A primary object of the present invention is to provide a fishing lure holder that is easily attachable to the user's person.

Another object of the present invention is to provide a fishing lure holder that is potentially modular so that more than one spare lure can be carried at a time.

Yet another object of the present invention is to provide a fishing lure holder where the existing hooks on the lure fit into a hook shaft clip integral with the holder so that the lure does not inadvertently fall out.

Still yet another object of the present invention is to provide a modular fishing lure holder that may be connected in a desired manner by hinge-like arrangements.

Another object of the present invention is to provide a fishing lure holder where the modular units may be clipped together in a predetermined fashion.

Another object of the present invention is to provide a fishing lure holder having a lure therein whereby the holder open end provides that the lure can easily be washed and left to dry within the holder.

Additional objects of the present invention will appear as the description proceeds.

The present invention overcomes the shortcomings of the prior art by providing a modular fishing lure holder that engages with the hook on the lure to prevent it from becoming lost while being carried and that also provides protection from the lure's hooks while granting ease of access to the lure itself More particularly, the present invention accomplishes the foregoing and related objectives by providing a modular fishing lure holder, which includes a housing having two ends, an open interior and an exterior surface and wherein the housing has a lure housing axis. A lure housing clip is located proximate to the exterior surface of the lure housing and extends parallel to, and along, the lure housing axis. A clip attachment portion is located on the lure housing clip and further located proximate one of the lure housing ends and with the clip attachment including a resilient fishing lure hook shaft slot that extends parallel to, and along the lure housing axis, wherein a fishing lure with at least one hook is able to be placed within the open interior of the lure housing and the at least one hook is able be inserted into the resilient hook shaft slot in the clip attachment portion, thus maintaining the fishing lure in place within the fishing lure holder.

It is thus desirable to provide a fishing lure holder that gives protection from the lure's hooks and easy access to the lure.

It is further desirable to have the lure holder be easily attachable to the user's person and to potentially be modular, so that more than one lure can be carried at the same time without recourse to a tackle box or the like.

Other objects and features of the present invention will become apparent when considered in combination with the accompanying drawing figures, which illustrate certain preferred embodiment of the present invention. It should, however, be noted that the accompanying drawing figures are intended to illustrate only select preferred embodiments of the claimed invention and are not intended as a means for defining the limits and scope of the invention.

BRIEF DESCRIPTION OF THE DRAWING FIGURES

In the drawing figures, wherein similar features are denoted with similar reference numerals throughout the several views.

DESCRIPTION OF THE REFERENCED NUMERALS

Figure 1:
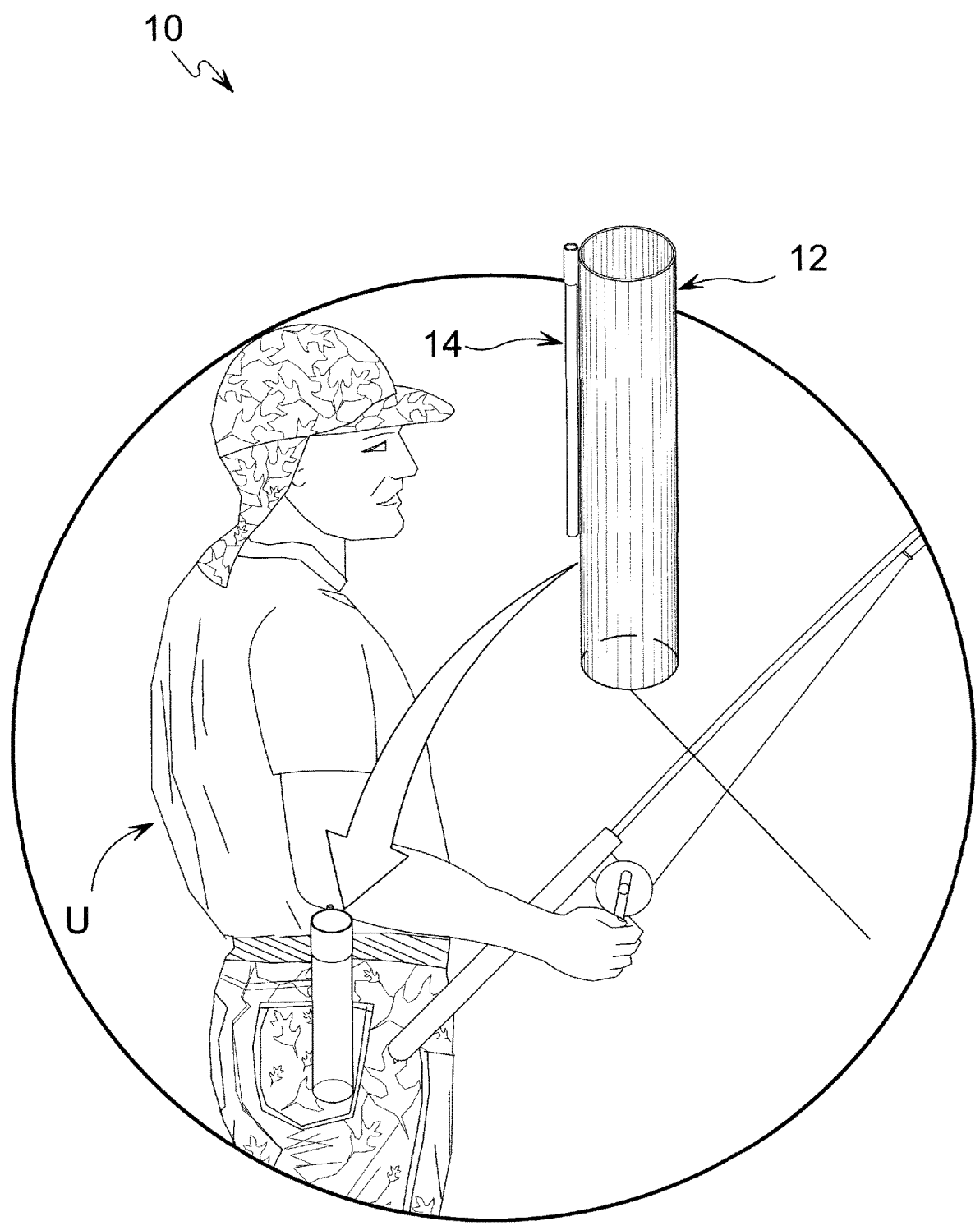
FIG. 1 is an overview of the present invention in use.

Turning now descriptively to the drawings, in which similar reference characters denote similar elements throughout the several views, the figures illustrate the use of the present invention. With regard to the reference numerals used, the following numbering is used throughout the various drawing figures:

10 present invention
12 lure housing body
14 lure housing clip
16 housing clip post
18 clip attachment portion
20 lure housing body interior
22 lure housing body exterior
24 fishing lure
26 fishing lure hook
28 fishing lure grommet
30 fishing lure hook shaft lock
32 hook shaft clip wall
34 cylindrical attachment portion wall
36 clip post C-clamp hinge
38 clip post collar hinge
40 collar portion
42 collar portion clip post
44 collar portion hook receiver
46 collar hinge
48 end cap
U user

DETAILED DESCRIPTION OF THE DRAWING FIGURES AND PREFERRED EMBODIMENTS

Turning now, in detail, to an analysis of the accompanying drawing figures, FIG. 1 shows the present invention 10 in use. The invention 10 includes a lure housing 12 which is cylindrical in shape and as shown in FIG. 1, is open at both ends. The present invention 10 also includes a housing clip 14 attached, integrally or otherwise, to the lure housing 12. This clip has a flexible extension, as will be discussed further below, to allow the lure housing 12 to be attached to a user. In FIG. 1, the clip 14 is attached to the user U's belt or clothing.

Figure 2:
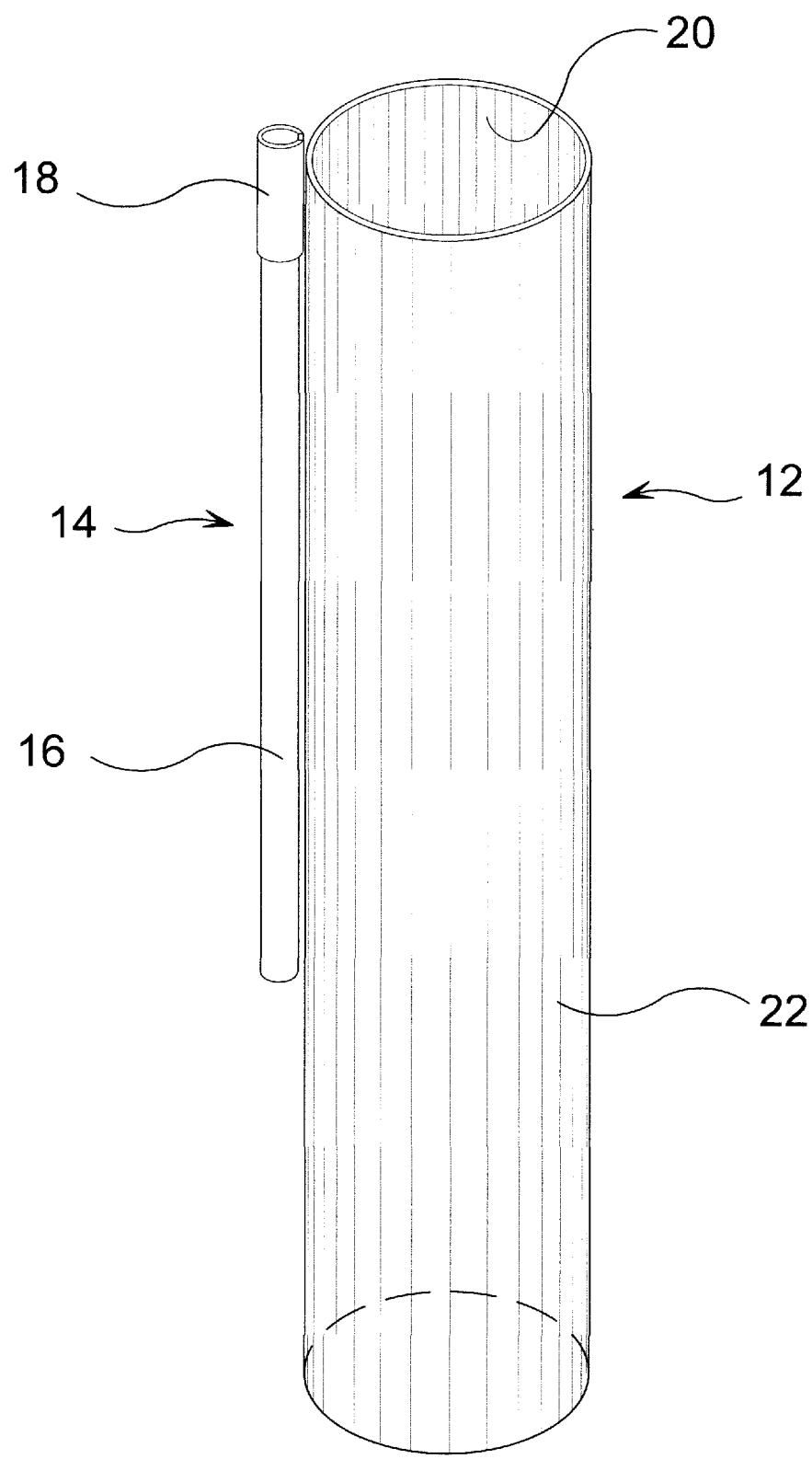
FIG. 2 is a perspective view of the fishing lure holder of the present invention.

FIG. 2 shows the present invention 10 in more detail. The lure housing 12 has an interior surface 20 and an exterior surface 22. The lure housing 12 generally describes a lure housing axis. The housing clip 14 is made up of the housing clip post 16 and the cylindrical clip attachment portion 18 which, as will be shown below, is adapted to receive the hook of the fishing lure. Housing clip post 16 could be made of a variety of materials, with varying degrees of flexibility, stiffness, and elasticity. It could be clipped to a belt, slipped in a pocket, hooked over an elastic cord, or the like. It should be noted that the housing clip post 16 is parallel to the lure housing axis described above.

Figure 3:
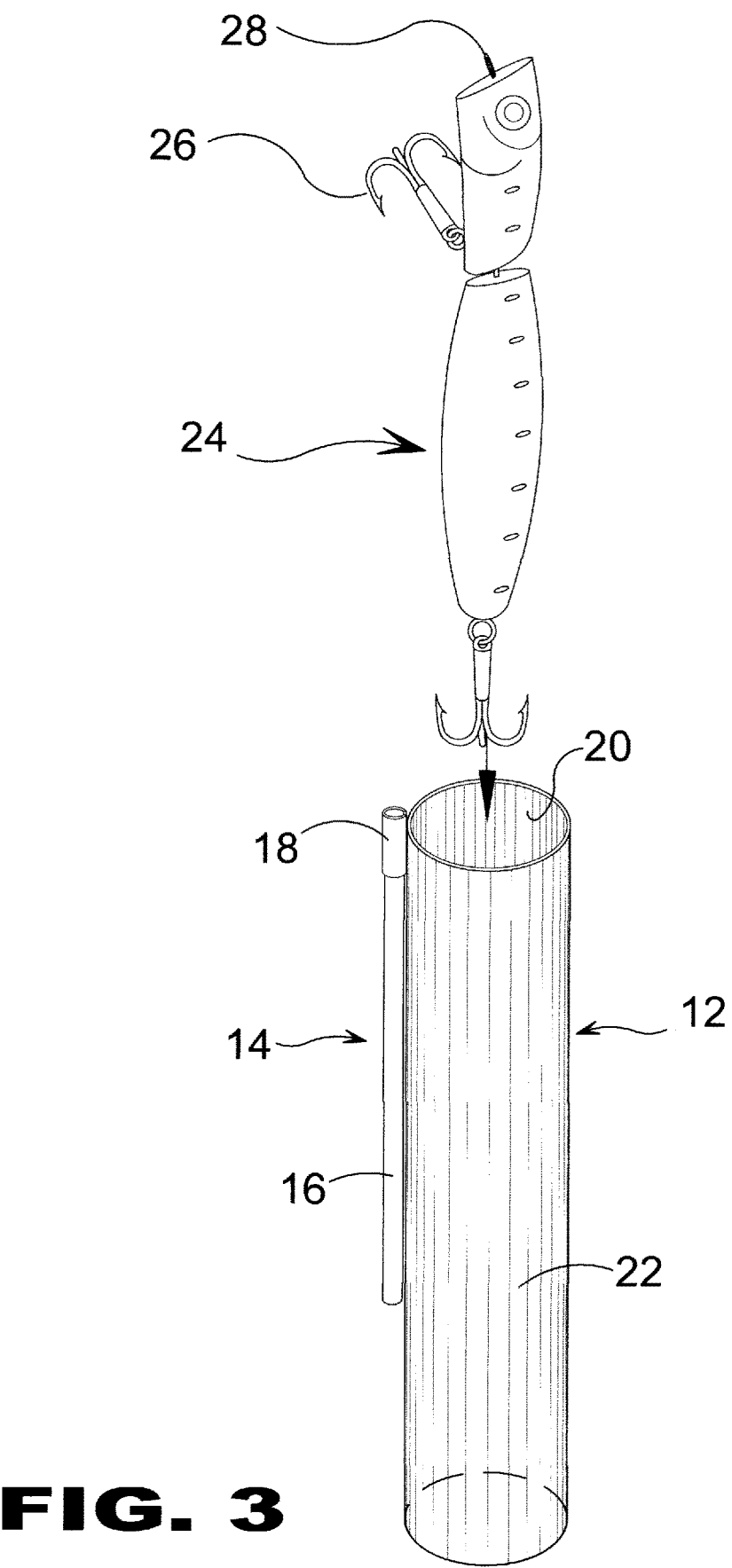
FIG. 3 is a perspective view of the fishing lure holder with a fishing lure being placed therein.

FIG. 3 shows a fishing lure 24 being placed into the lure housing 12 of the present invention. The lure 24 shown has hooks 26 and a grommet 28 (or the like) for attachment to the fishing line.

Figure 4A:
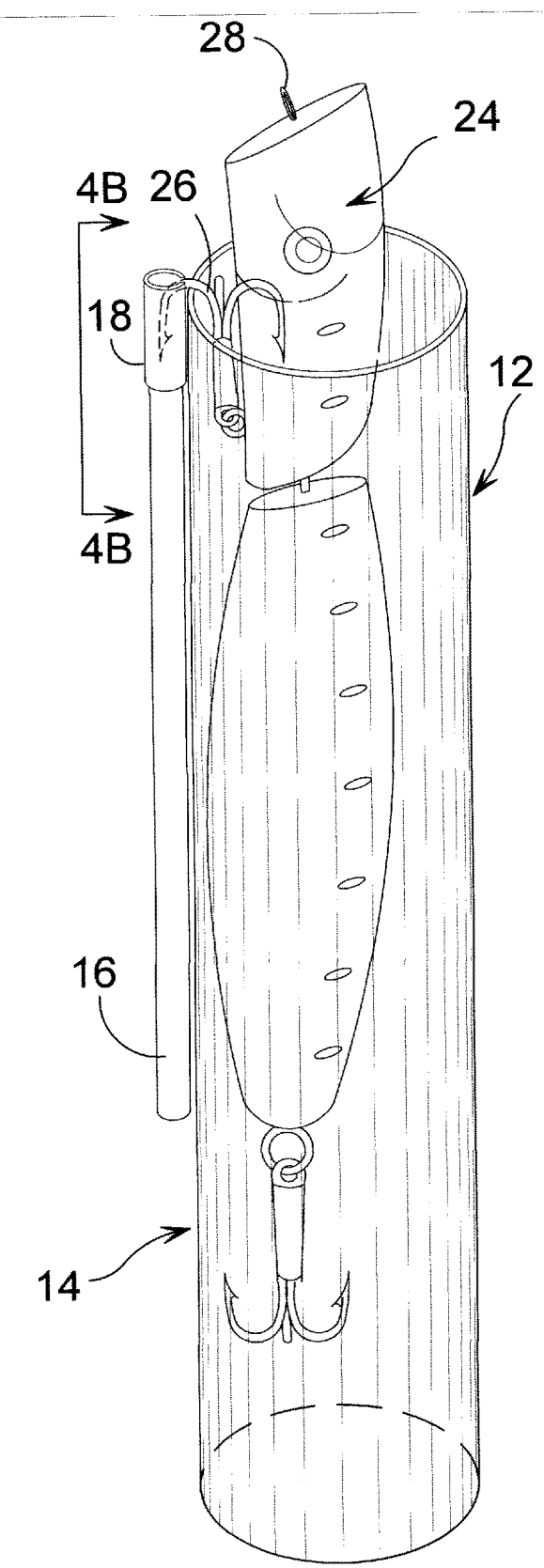
FIG. 4A is a perspective view of the fishing lure holder in use.
Figure 4B:
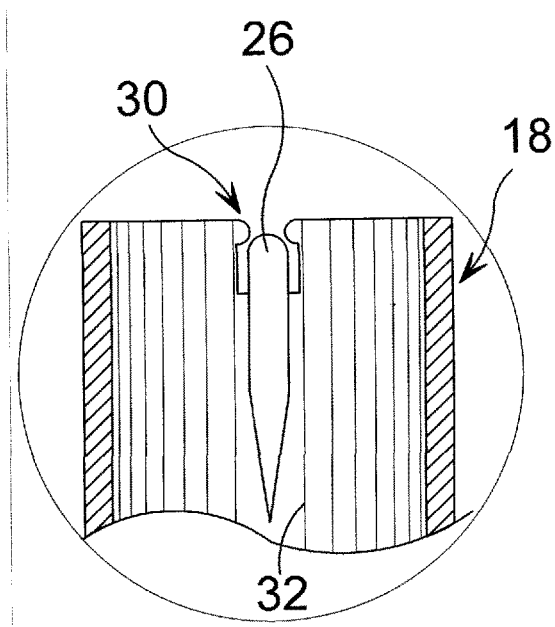
FIG. 4B is an enlarged view of the hook shaft clamp or clip along lines 4B-4B.

FIGS. 4A and 4B show the hook engagement features of the present invention. When the lure 24 is placed in the lure holder 12 one of the hooks 26 of the lure 24 are engaged by the hook shaft lock 30 located in the wall of the cylindrical clip attachment portion 18. This hook shaft lock 30 is made up of hook clip walls or clamps indicated at 32 that hold the hook in place.

Figure 5:
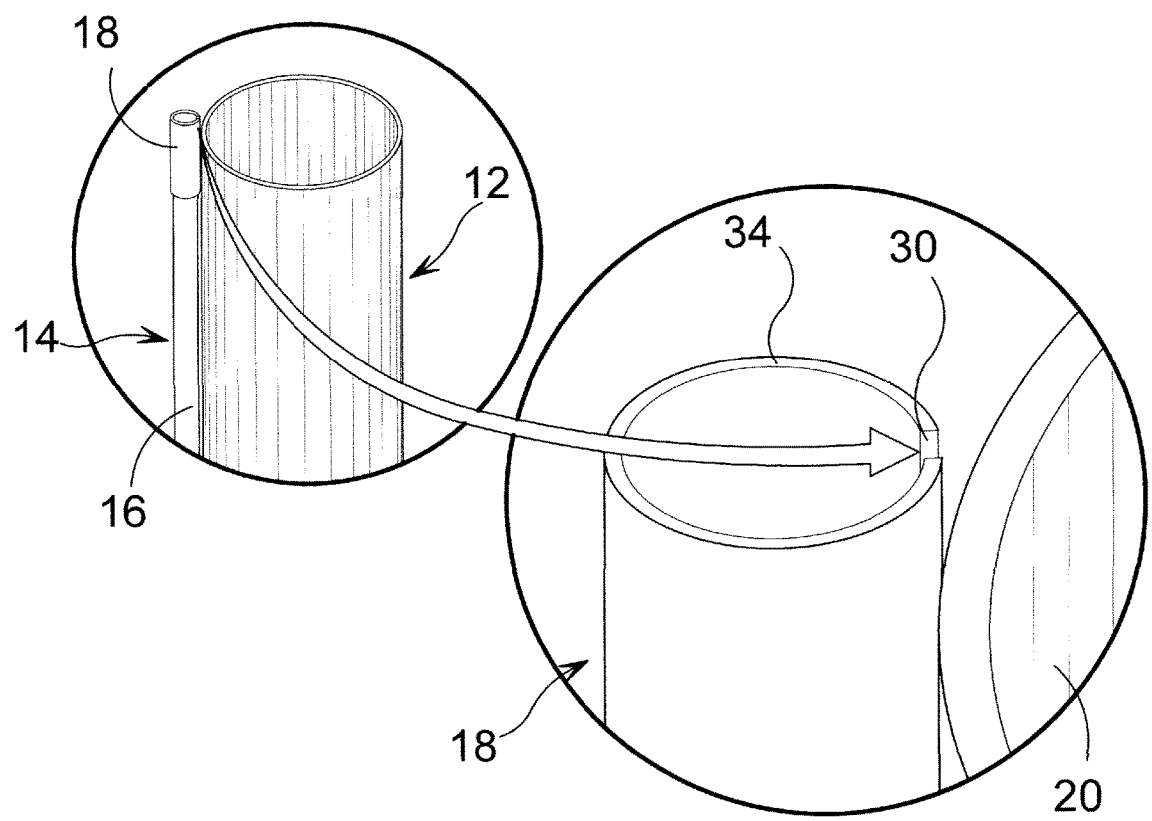
FIG. 5 is a detailed view of the hook shaft clamp or lock and the hollow housing clip portion.

FIG. 5 shows more details of the hook shaft lock 30 placement within the cylindrical attachment portion wall 34. When the lure 24 is placed within the lure holder 12, the hook or hooks may be fitted in the clip to hold the lure 24 in place.

Figures 6A, 6B:
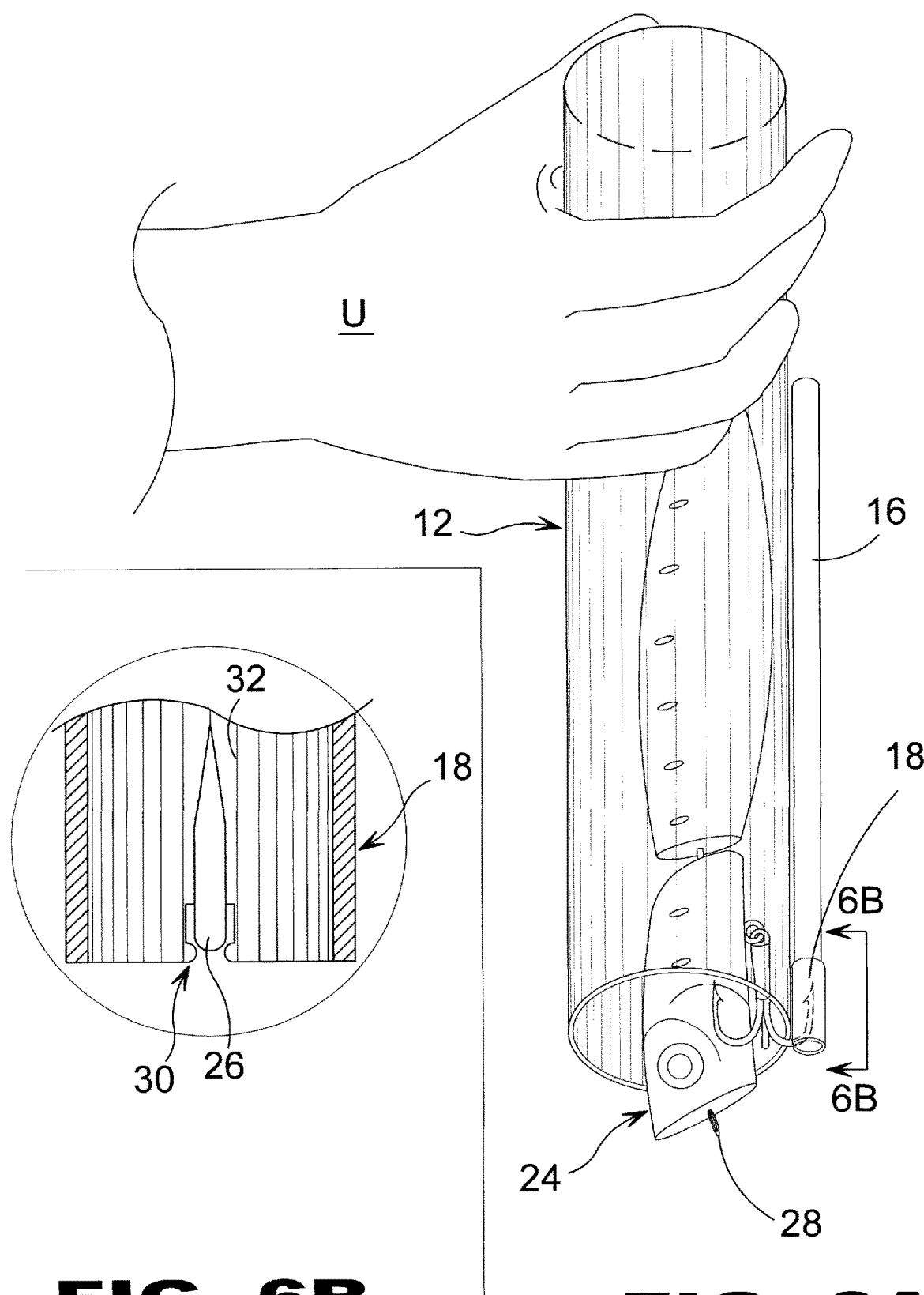
FIG. 6A is a perspective view of the present invention showing the frictional hold of the hook shaft clamp if the holder is tipped.
FIG. 6B is an enlarged view of the hook clamp frictional fit along line 6B-6B.

This is seen in FIGS. 6A and 6B where the present invention 10 has been tipped by the user U. The hook 26 of the lure 24 is held by the hook lock 30 and its clip walls 32. The material that makes up the wall 34 comprising the clip walls 32 would be flexible and resilient enough to frictionally hold the lure 24 in place.

Figure 7:
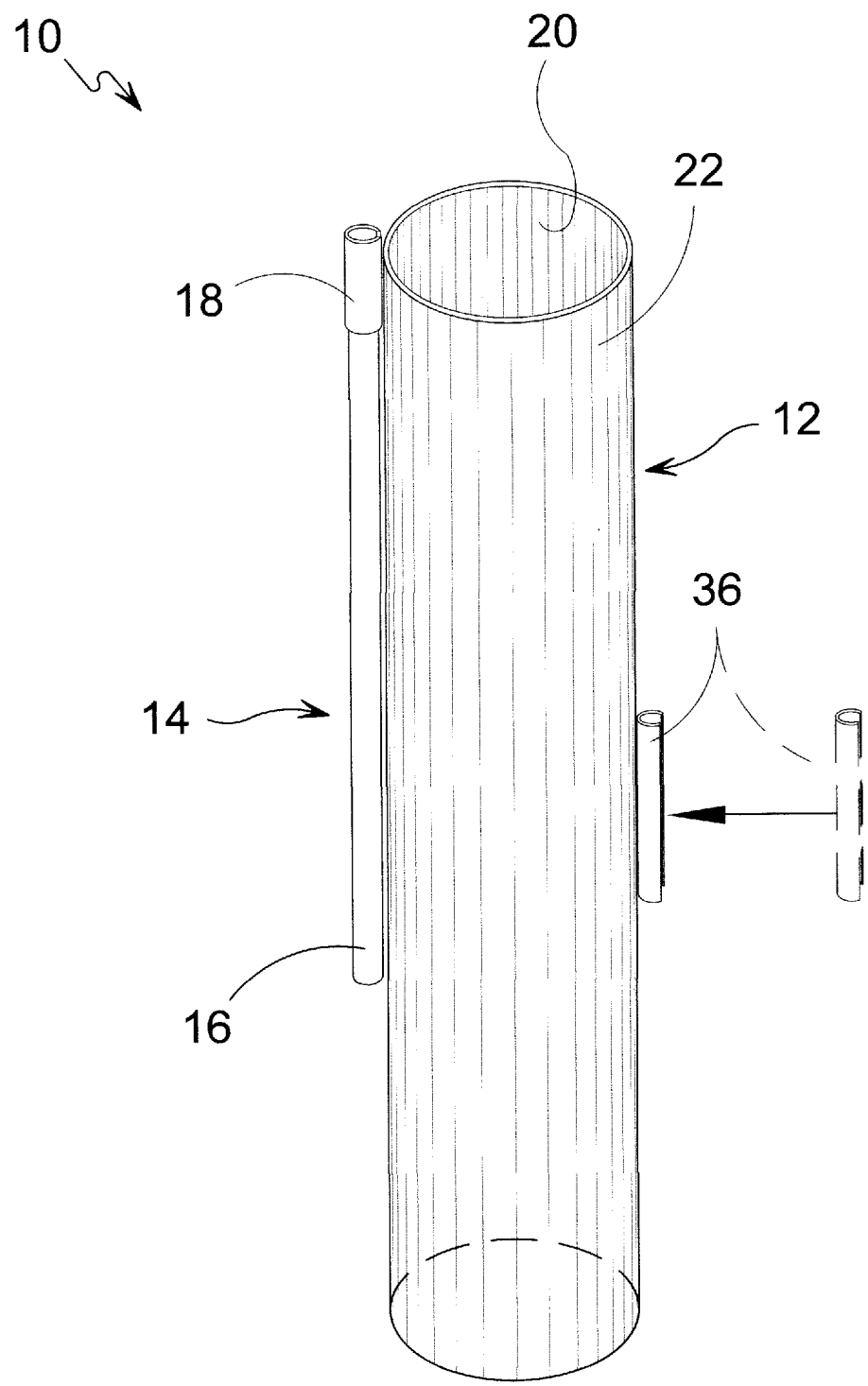
FIG. 7 is a perspective view of the present invention in an embodiment where an additional clip post clamp is provided to allow the attachment of additional holders, one to the other by engaging the corresponding integral clip posts.

In FIG. 7, an embodiment of the invention 10 is shown with a clip post C-clamp 36 on the exterior 22 of the lure holder 12. The C-clamp 36 is sized such that it engages the clip post 16 of another lure housing clip post 14. In this way, a desired number of lure holders 12 and their associated lure holder housing clips 14 can be linked together.

Figure 8:
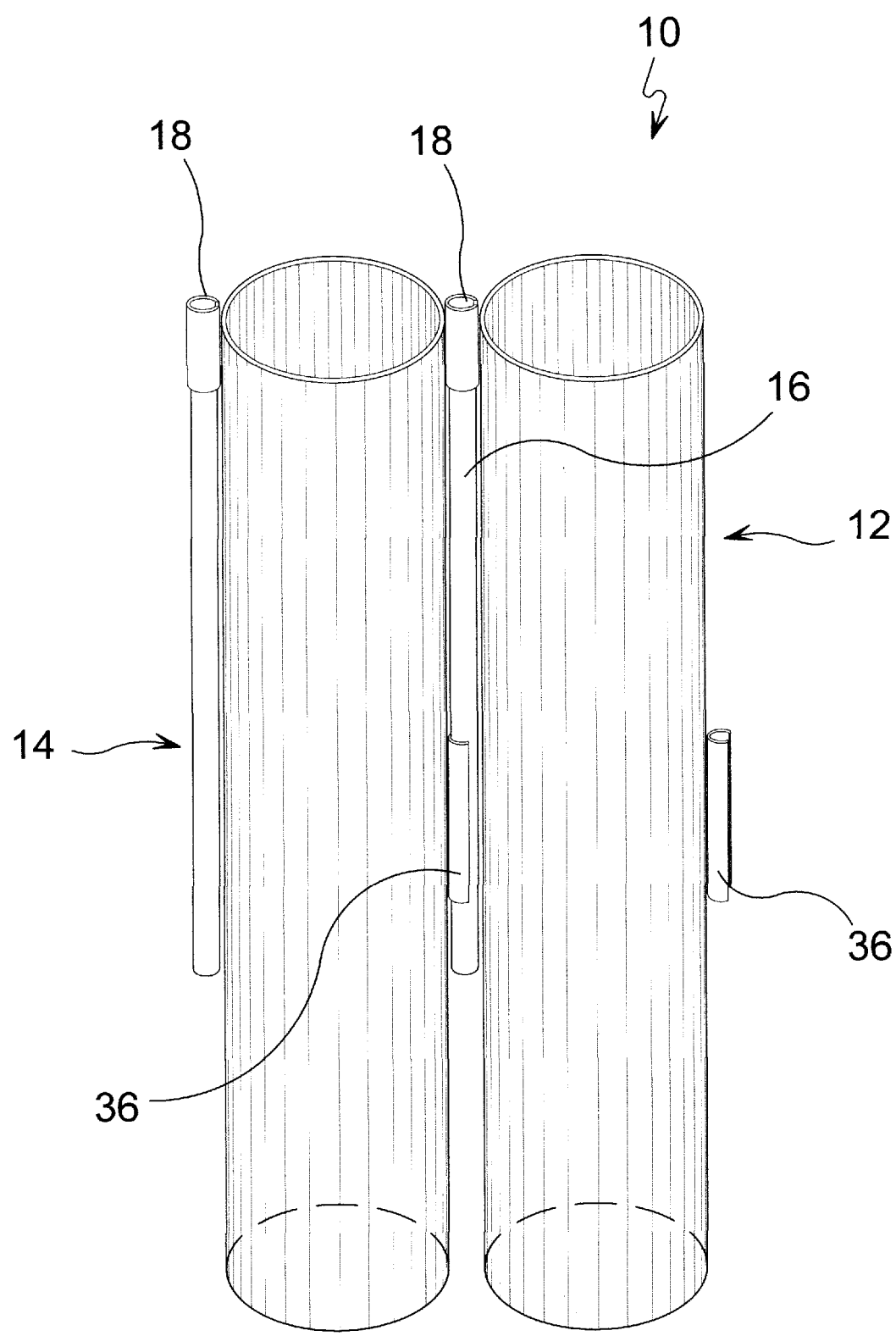
FIG. 8 is a perspective view of two holders attached by clip post clamps.

FIG. 8 shows this arrangement. The clip post C-clamp 36 receives the clip post 16 from the second lure housing clip. The two lure housing bodies 12 can rotate in a limited fashion to form a chain or the like. It should be noted that the clip post C-clamp 36 could be permanently (adhesives), be integral, or be semi-permanently attached (hook-and-loop fasteners) to the lure housing 12.

Figure 9:
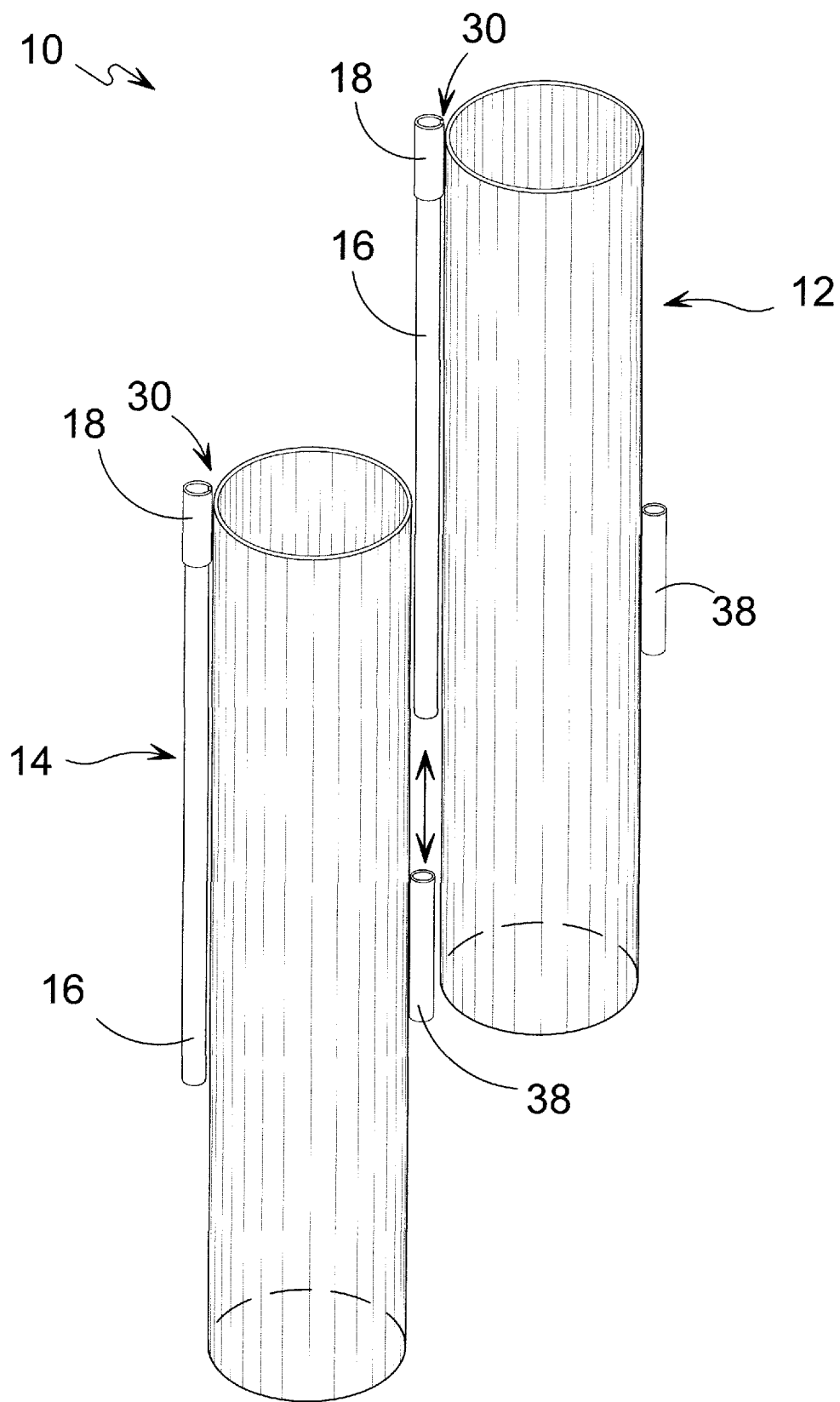
FIG. 9 is a perspective view of an embodiment of the present invention wherein the holders are rotatably attached by a hinge-like arrangement.

FIG. 9 shows another embodiment of the present invention where the latching or linking between the lure housings 12 and the housing clips 14 is done with a clip post hinge indicated at 38. The clip post hinge 38 is dimensioned to receive the clip post 16 of a housing clip 14. This arrangement also allows linking and chaining the lure holders 12 together.

Figure 10:
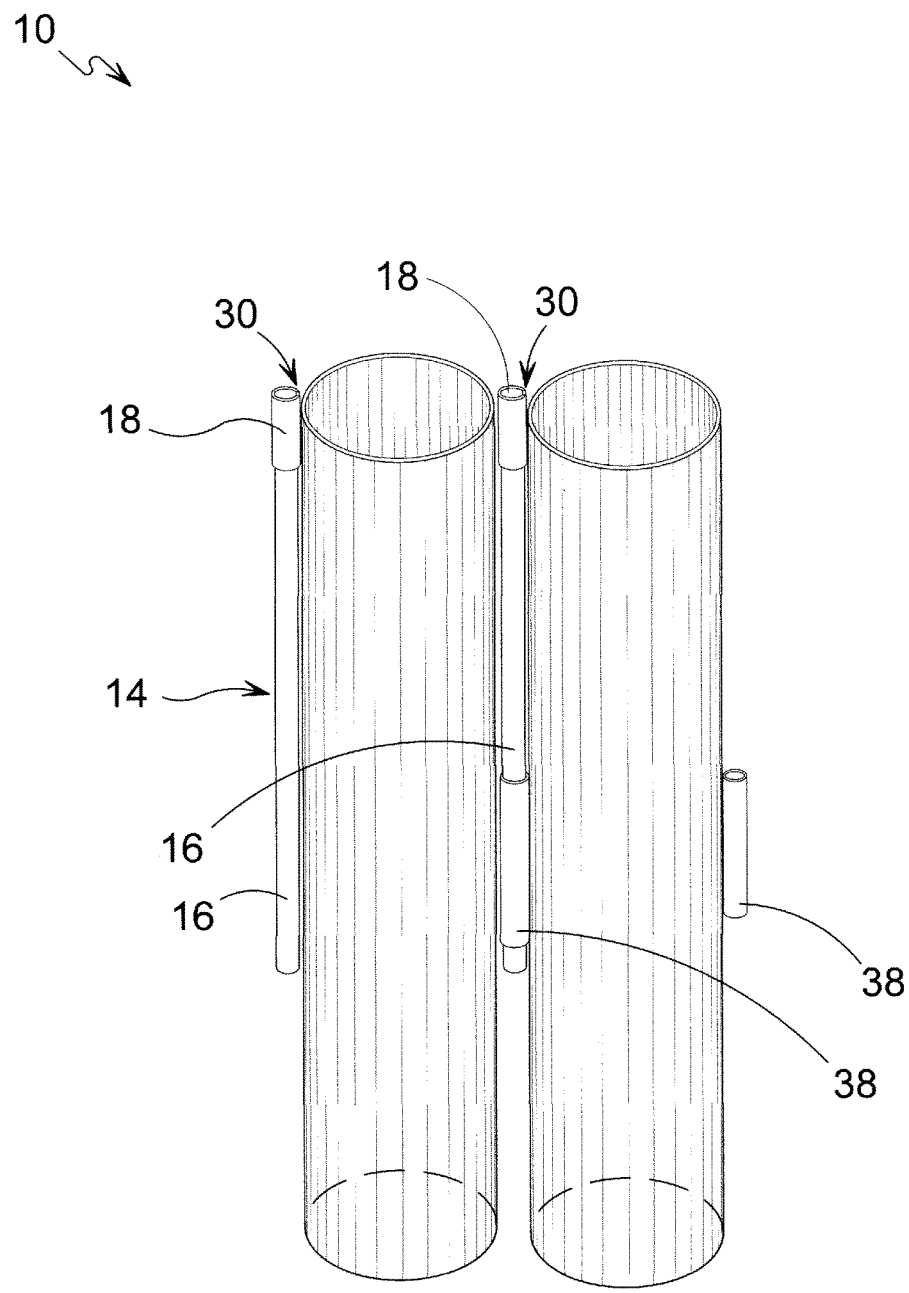
FIG. 10 is a perspective view of two holders attached with a hinge arrangement.

FIG. 10 shows two of the lure holders 12 and their housing clips 14 linked together with the arrangement discussed above concerning FIG. 9. The clip post hinge 38 would be sized such that frictional engagement would hold the lure holders 12 together and allow them to rotate along the clip posts 16.

Figure 11:
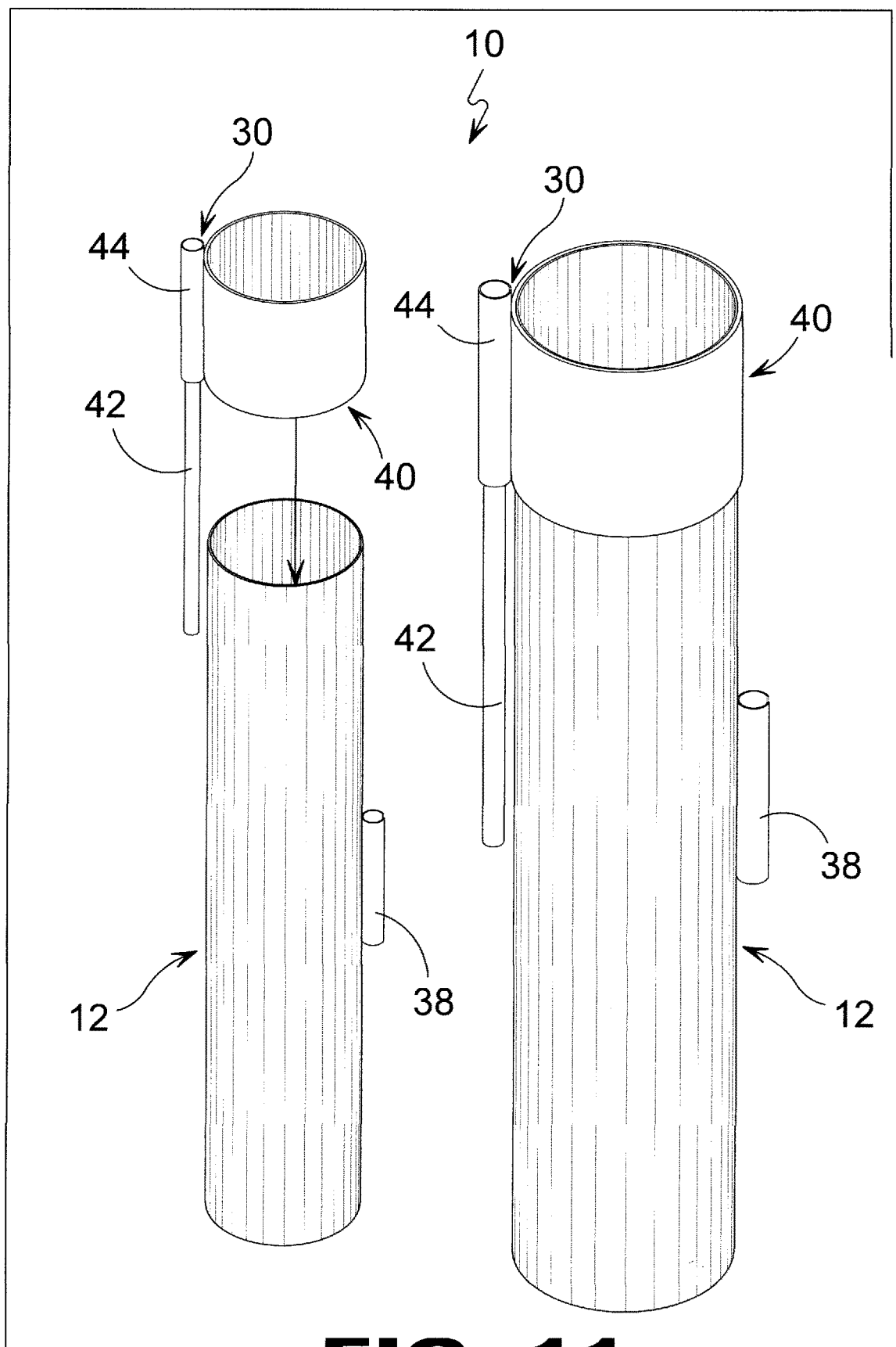
FIG. 11 is a perspective view of another alternative embodiment where a rigid or semi-rigid collar incorporates the clip post holder.

Turning to FIG. 11, another embodiment of the present invention 10 is shown. In this embodiment, instead of the lure housing clip 14 seen in the previous Figures, the lure housing 12 is provided with a collar portion 40. This collar portion 40 may be rigid or semi-rigid. Collar portion 40 includes a collar portion hook receiver 44 and a collar portion clip post 42. It should be noted that the collar hook receiver 44 is a hollow cylinder similar to that seen in the previous Figures and includes a similar hook shaft lock 30 that is not shown in FIG. 11 to hold the hook 26 of the lure 24.

Figure 12:
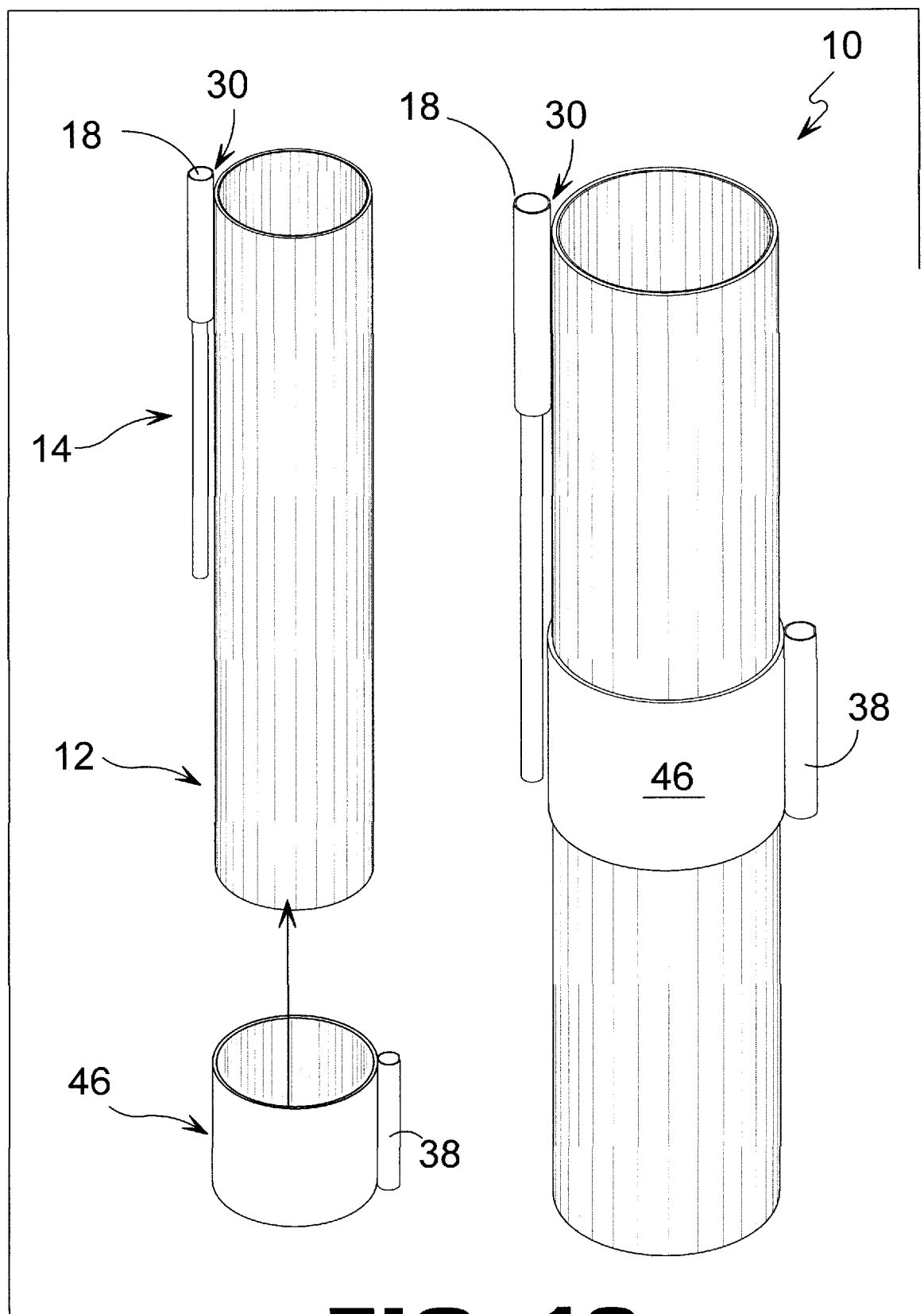
FIG. 12 shows an embodiment of the invention wherein the rigid collar can also serve to connect the holders longitudinally.

FIG. 12 shows an embodiment of the invention 10 where the lure holder 12 and the holder clip 14 are supplemented by a collar hinge 46. This includes a clip post hinge 38, as discussed above.

Figure 13:
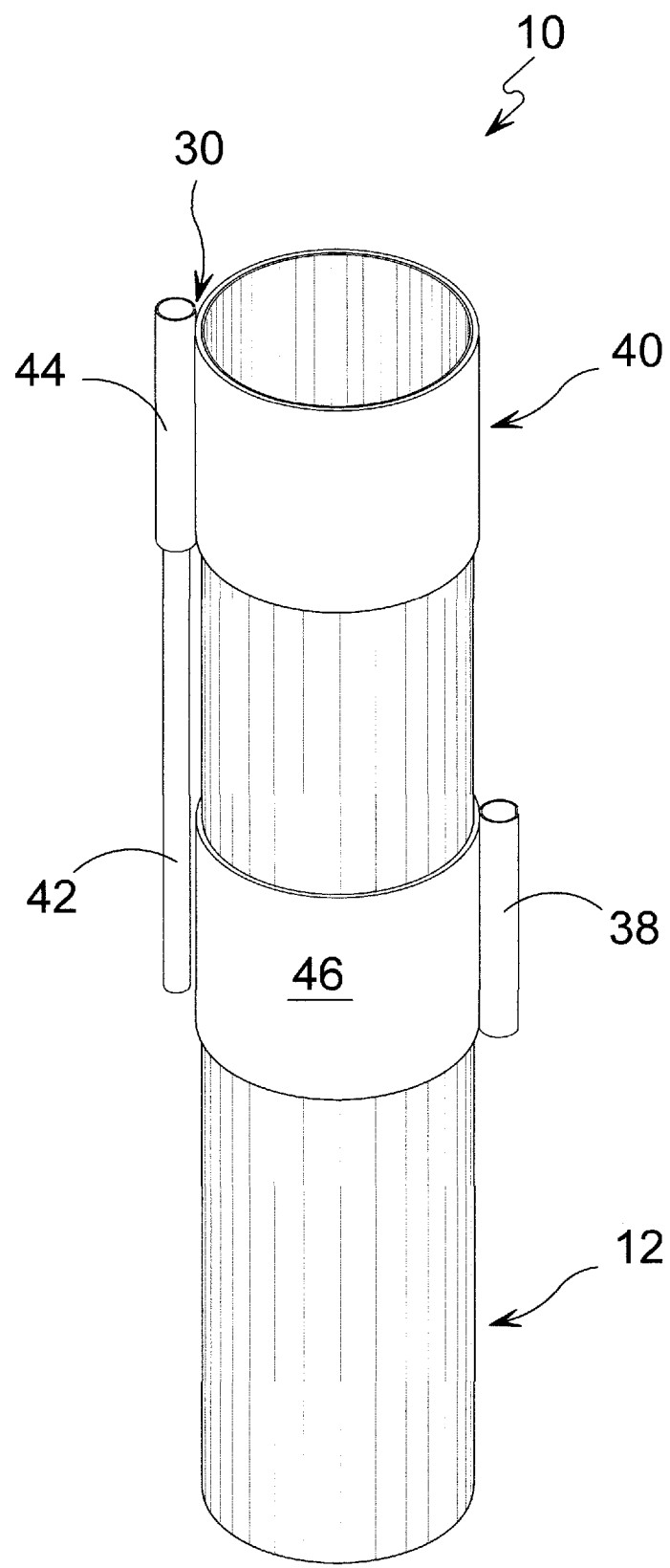
FIG. 13 shows a pair of rigid collars; one connecting two holders longitudinally and the other serving as the clip post for attaching the holders to a user's person.

FIG. 13 shows an enablement of the invention 10 that utilizes both a collar portion 40, collar portion hook receiver 44, collar portion clip post 42 and a collar hinge 46 with its clip post hinge 38.

Figure 14:
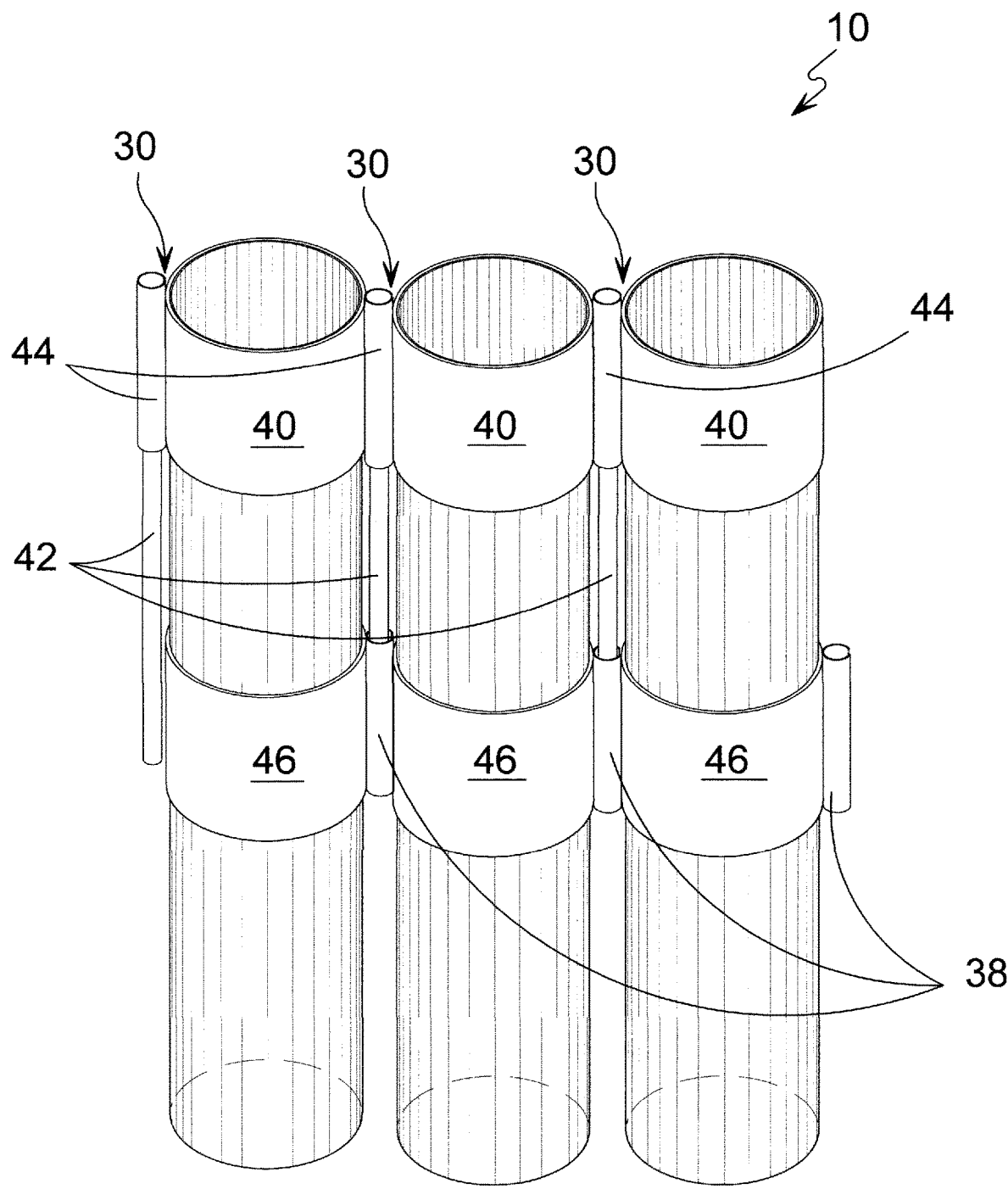
FIG. 14 is a perspective view of the present invention showing three holders linked together.

In FIG. 14 we see three lure holder bodies 12 connected together through collar portions 40 and collar hinges 46. The collar clip posts 44 depending from the collar portions 40 fit into the clip post hinges 38 on the collar hinges 46.

Figure 15:
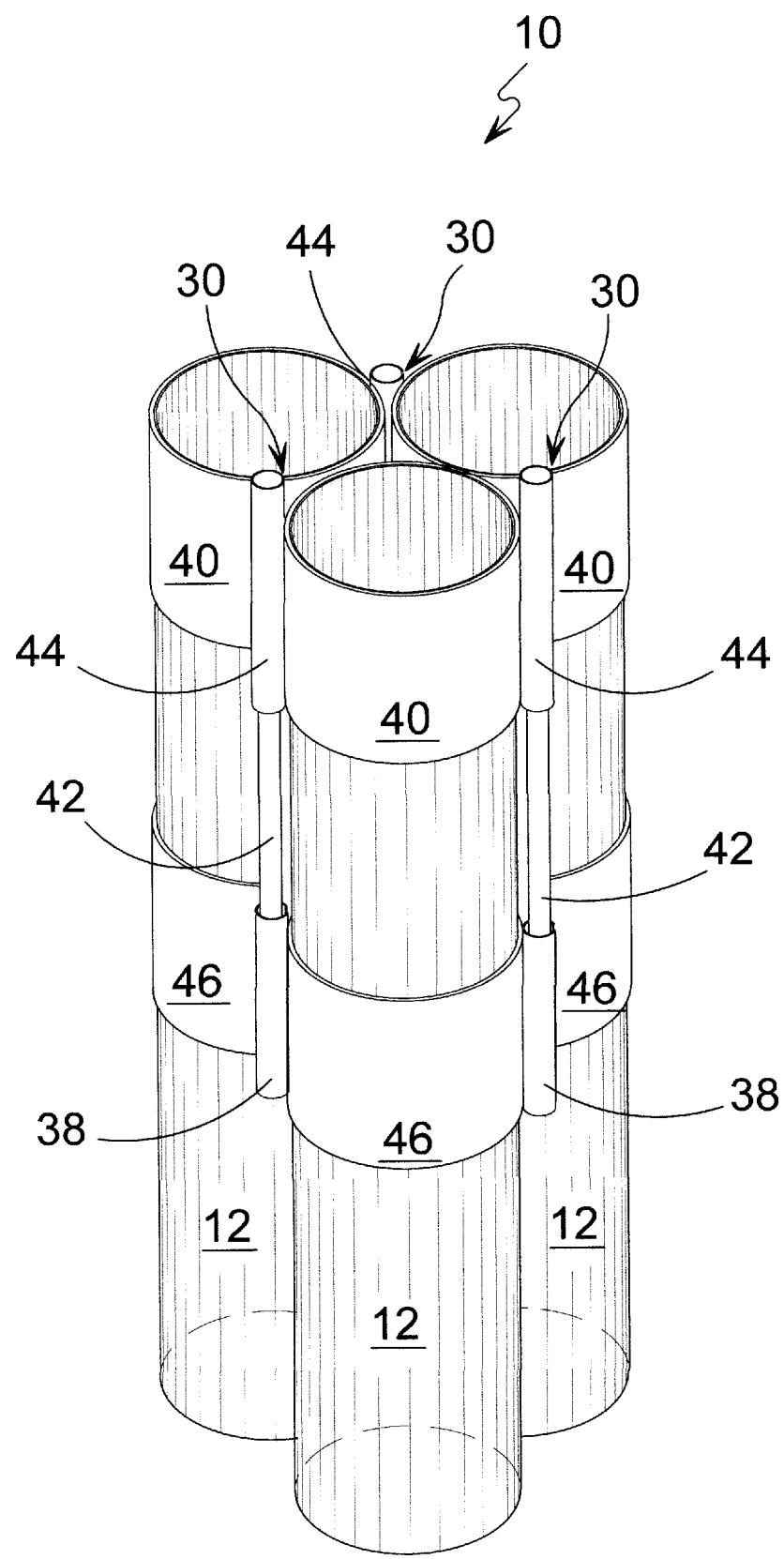
FIG. 15 is another perspective view of three holders linked.

FIG. 15 shows an alternative embodiment where three of the fishing lure holders 12 are arranged in a triangle.

Figure 16A:
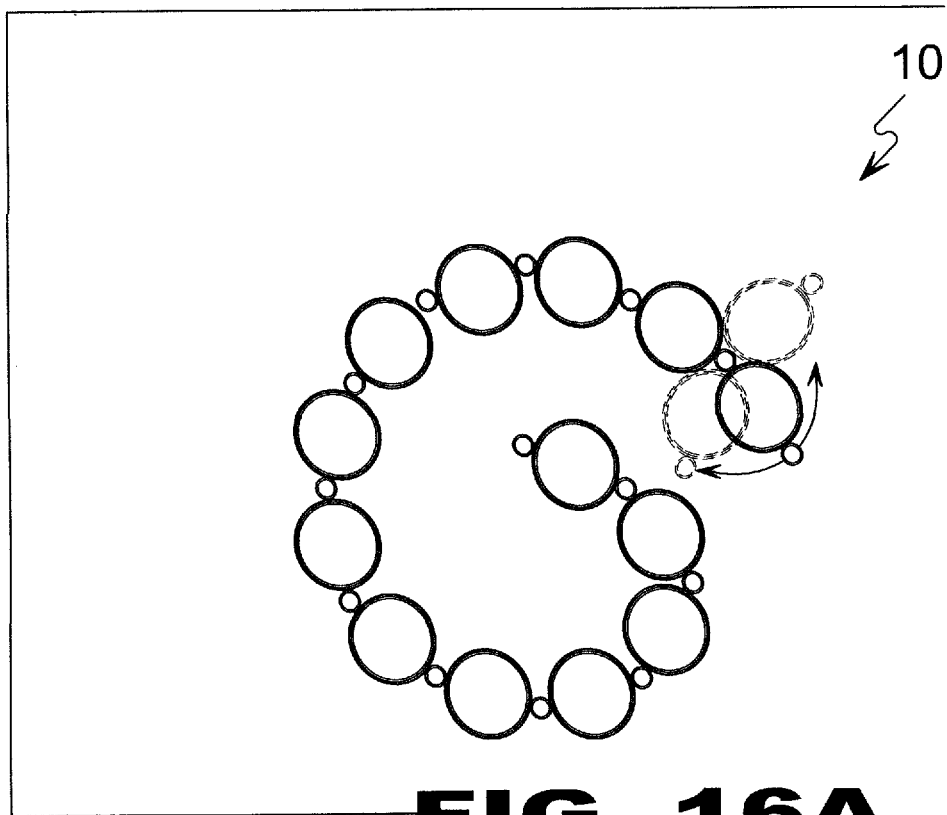
FIG. 16A is a further perspective view showing the functionality of a plurality of linked holders.
Figure 16B:
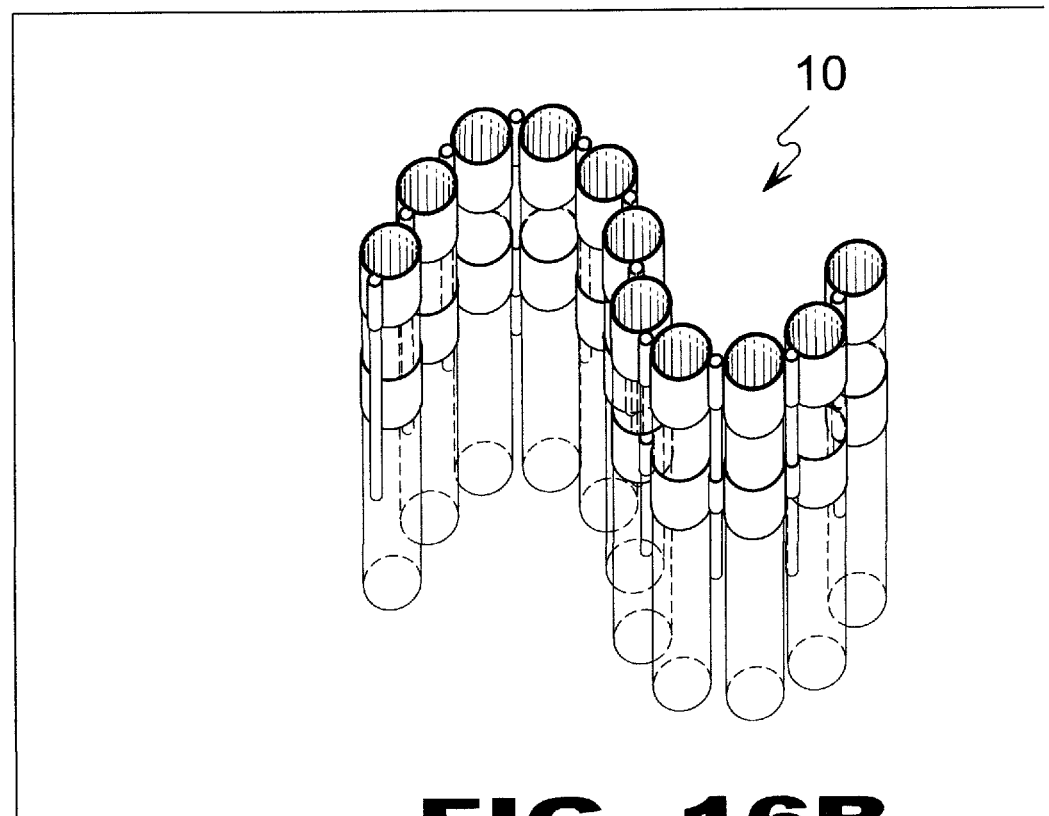
FIG. 16B is a top view of a plurality of linked holders.

FIGS. 16A and 16B show another perspective view illustrating the functionality of the present invention. The lure housing provides collar portion. Collar portion includes a collar portion hook receiver and a collar portion clip post. It should be noted that the collar hook receiver is a hollow cylinder similar to that seen in the previous Figures and includes a similar hook shaft lock 30 to hold the hook of the lure shown in previous figures. FIG. 16B shows a top view of a plurality of linked holders. When linked, each of the holder's pivots by virtue of the clip post seated within an adjacent clip post collar.

Figure 17:
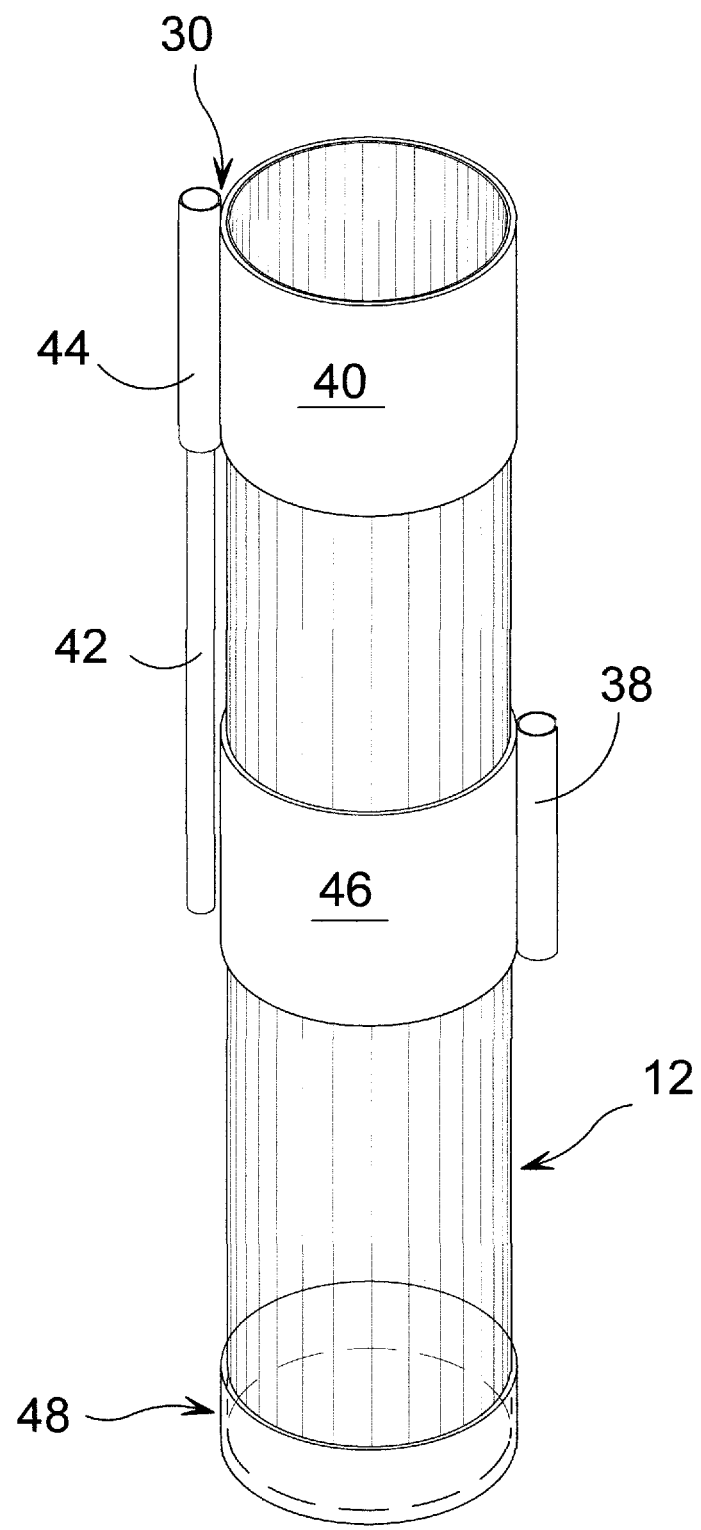
FIG. 17 is an additional embodiment of the present invention incorporating a solid cap at one end of the holder.

Lastly in FIG. 17, an embodiment of the invention 10 is shown where the lure holder body 12 also has the collar portion 40 slid thereover with collar portion clip post 42 and collar portion hook receiver 44 attached. Additionally in FIG. 17 is collar hinge 46 and end cap 48, which essentially closes one of the open ends if the lure holder body 12.

While only several embodiments of the present invention have been shown and described, it will be obvious to those skilled in the art that many modifications may be made to the present invention without departing from the spirit and scope thereof.

What is claimed is:

1. A modular fishing lure holder, comprising:
   a lure housing body having a first end and a second end, an open interior and an exterior surface, wherein said lure housing body has a lure housing axis, said lure housing body further including a clip post C-clamp located on said exterior surface of said lure housing body;
   a collar portion frictionally fit over said exterior surface of said lure housing body; and
   said collar portion fixedly engaged with a lure housing clip located proximate said exterior surface of said lure housing body and extending parallel to, and along, said lure housing body axis with said lure housing clip including a cylindrical lure housing clip post extending along outwards of said exterior surface of said lure housing body and parallel to said lure housing body axis, said clip post C-clamp being coaxially engageable with said cylindrical lure housing clip post, so that a predetermined number of lure housing bodies are fixable in proximate relation to one another through said clip post C-clamp coaxial engagement;
   a collar portion hook receiver located on said lure housing clip and further located proximate said collar portion, wherein said collar portion hook receiver includes a resilient fishing lure hook shaft slot extending parallel to, and along, said lure housing axis, whereby,
   said lure housing clip post is engageable to a user's clothing; and
   a fishing lure with at least one hook is able to be placed within said open interior of said lure housing body and the at least one hook is able to be inserted into said resilient fishing lure hook shaft slot for maintaining the fishing lure in place within said fishing lure holder.

2. The modular fishing lure holder according to claim 1 wherein said cylindrical lure housing clip post is made of a resilient plastic.

3. The modular fishing lure holder according to claim 1, wherein said lure housing body ends includes an end cap on at least one of said first end and said second end.

\* \* \* \* \*